(12) United States Patent
Usui

(10) Patent No.: US 6,400,902 B1
(45) Date of Patent: Jun. 4, 2002

(54) BLUR CORRECTION APPARATUS

(75) Inventor: Kazutoshi Usui, Kawasaki (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 09/458,097

(22) Filed: Dec. 10, 1999

(30) Foreign Application Priority Data

Dec. 11, 1998 (JP) .......................................... 10-352671
Jul. 30, 1999 (JP) .......................................... 11-217247

(51) Int. Cl.$^7$ ............................................. G03B 17/00
(52) U.S. Cl. ....................................................... 396/55
(58) Field of Search ............................. 396/55, 52, 53, 396/54; 348/208; 359/555

(56) References Cited

U.S. PATENT DOCUMENTS

| | | | | |
|---|---|---|---|---|
| 4,881,800 A | * | 11/1989 | Fuchs et al. ................. | 359/555 |
| 5,761,546 A | * | 6/1998 | Imada .......................... | 396/55 |
| 5,771,069 A | * | 6/1998 | Kobayashi ................... | 348/208 |

FOREIGN PATENT DOCUMENTS

JP  A-9-80561  3/1997

* cited by examiner

*Primary Examiner*—Russell Adams
*Assistant Examiner*—Arthur A Smith
(74) *Attorney, Agent, or Firm*—Oliff & Berridge PLC

(57) ABSTRACT

Blur correction apparatus for correcting blurring of an image photographed using a photographic optical system comprises a blur correction optical system acting to correct image blurring during photographing, a blur correction drive section for electromagnetically driving the blur correction optical system, and a lock member for locking the blur correction optical system. The blur correction drive section has a permanent magnet, one surface of which is used in the blur correction drive section, and another surface of which is used in a lock member drive section. The blur correction drive section is fixed to the permanent magnet and includes a yoke having projections formed at prescribed intervals along the permanent magnet and four coils opposing to both the permanent magnet and the projections with a prescribed gap and connecting to the blur correction optical system.

10 Claims, 15 Drawing Sheets

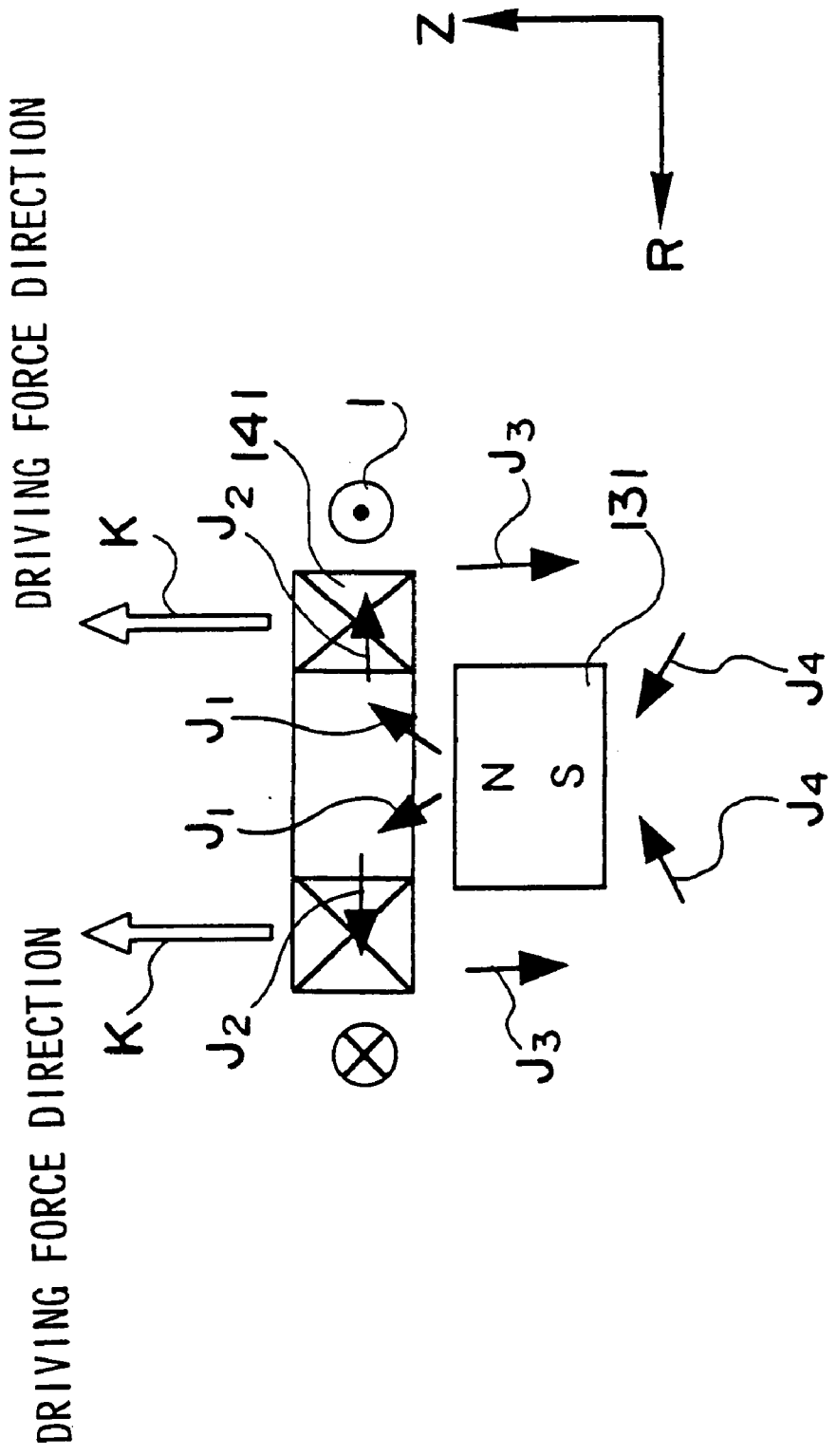

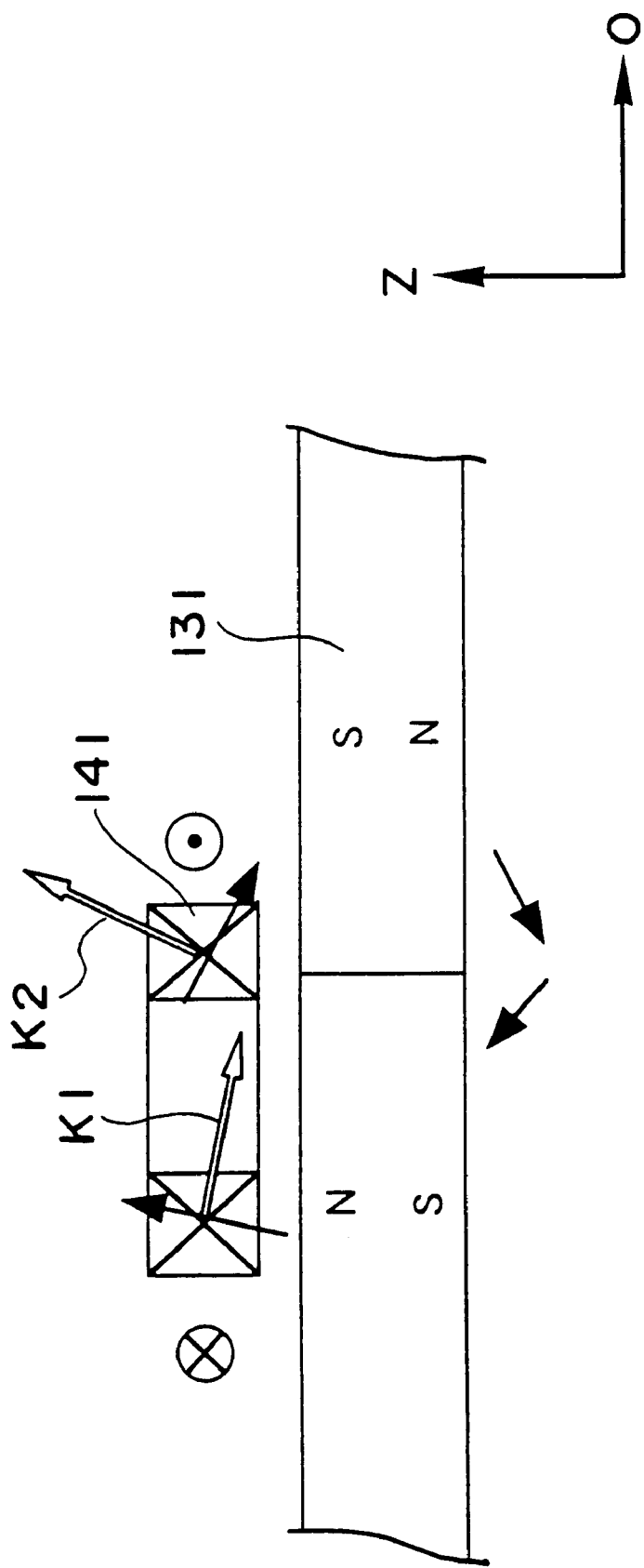

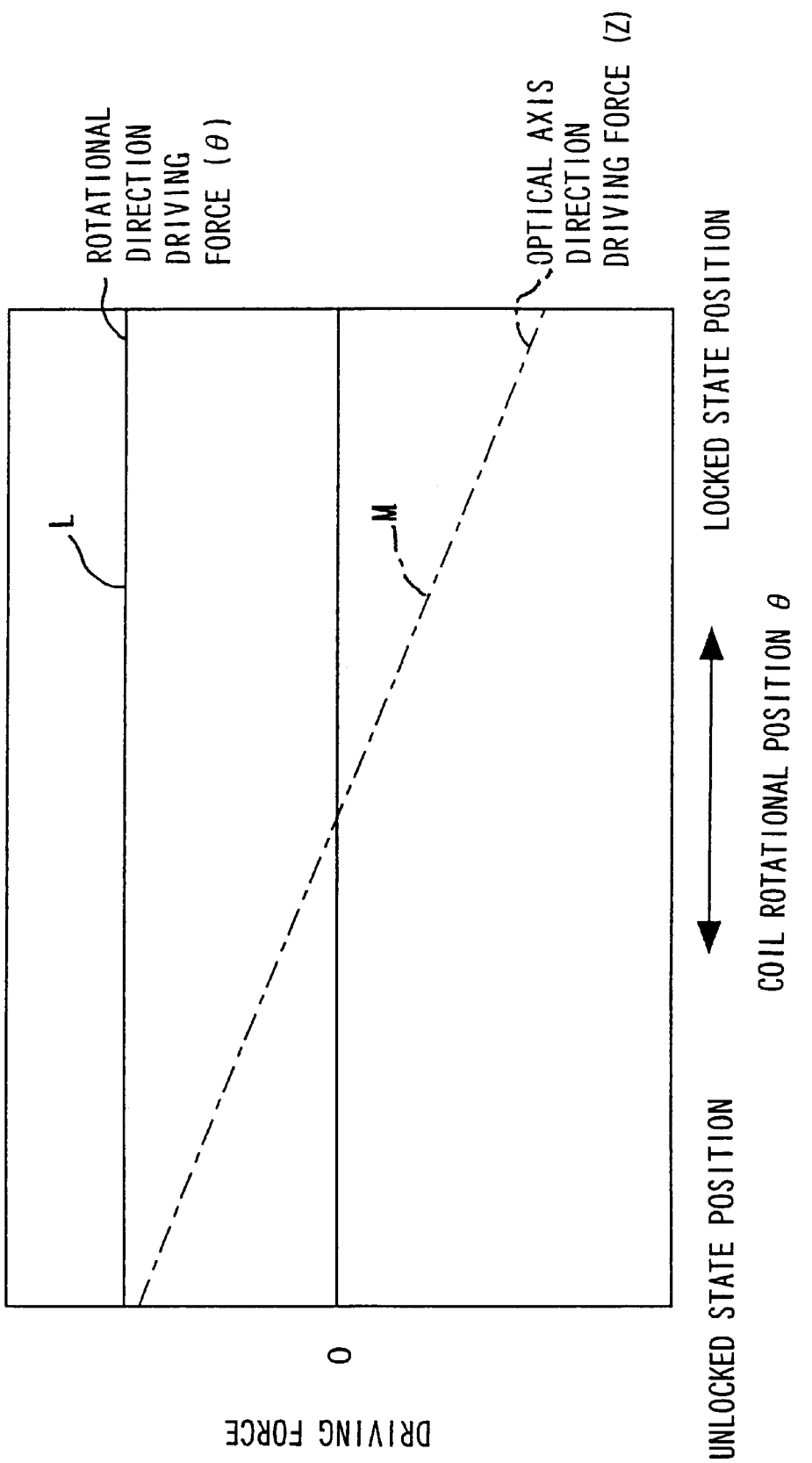

BLUR CORRECTION APPARATUS

INCORPORATION BY REFERENCE

The disclosure of the following priority applications are incorporated herein by references: Japanese Patent Applications No. 10-352671 filed Dec. 11, 1998 and No. 11-217247 filed Jul. 30, 1999.

BACKGROUND OF THE INVENTION

1. Field of the Invention

The present invention relates to blur correction apparatus for correcting blur in optical equipment such as a camera, detachable lens, video camera, or binoculars, etc. by moving part or all of a lens.

2. Description of the Related Art

In recent years, in order to prevent blurring in cameras, technology has become established for correcting image blurring on a film surface by detecting camera shake or camera vibration and moving a blur correction lens according to this shake.

Blur correction lens driving usually commences in synchronism with a prepare for photographing operation (an operation of half-pressing the release button, hereinafter simply referred to as a "half press") signal of the camera and ends in synchronism with a half-press timer OFF signal. A blur correction switch is also provided on the outside of the lens barrel in order to decide whether or not to carry out blur correction control. A photographer then usually uses this switch to select whether or not the blur correction control is to be operational.

On the other hand, when the blur correction lens is not being driven, it is necessary to lock the blur correction lens at a position where the optical axis of the blur correction lens coincides with the center of the optical axis of the photographing optical system. If the blur correction lens is not locked when photographing without carrying out blur correction control, the blur correction lens may move during photographing, so that there is the possibility of the occurrence of finder image shake (blur) or the occurrence of deterioration in the photographed image. A mechanism for locking a blur correction lens is put forward in Japanese Patent Laid-open No. Hei. 9-80561.

An electromagnetic drive section having a magnet is employed in the related blur correction apparatus. Because high efficiency is required of this electromagnetic drive unit, the use of two expensive magnets is typical. This increases both the number of parts and the number of assembly steps.

In order to lock a blur correction lens, it is necessary to provide an electromagnetic drive section which may include a stepping motor or a latch solenoid (Japanese Patent Laid-open No. Hei. 9-80561), so that the blur correction unit becomes even larger.

Methods of mechanically locking blur correction lens in an interlocked manner with the turning off of a blur correction switch have also been put forward, but space is required for lock interlocking and the number of parts is increased.

SUMMARY OF THE INVENTION

It is therefore an object of the present invention to provide a small blur correction apparatus having a reduced number of parts.

It is a further object of the present invention to provide a blur correction apparatus having a locking mechanism that is highly reliable, difficult to operate in an erroneous manner, requires few parts and takes up little space.

In order to achieve the aforementioned object, a blur correction apparatus according to the present invention comprises a blur correction optical system acting to correct blurring and a blur correction drive section for electromagnetically driving the blur correction optical system. The blur correction drive section includes a permanent magnet, with one surface of the permanent magnet being used in the blur correction drive section and the other surface being used in another drive section for electromagnetic driving an object to be driven.

The blur correction drive section comprises a yoke fixed to the permanent magnet and having projections formed at prescribed intervals along the permanent magnet, and four coils provided opposite to both the permanent magnet and the projections with a prescribed gap and connected to the blur correction optical system.

The permanent magnet can be polarized into at least two poles within a plane. In this case, coils used in the other drive section for electromagnetic driving the object to be driven can be located in the vicinity of polarization points and it is preferable to support the blur correction optical system by four flexible wire-shaped members, at least two flexible wire-shaped members are provided in the vicinity of the points of polarization.

When a photographing optical system is equipped with the blur correction apparatus, the other drive section rotates about the optical axis of the photographing optical system.

The other drive section can be a lock drive section which limits movement of the blur correction optical system. The lock drive section comprises projections for fixing provided at a holding frame of the blur correction optical system, first and second rotating members for fixing which rotate about the optical axis having notches larger than the projections for fixing by at least a movable range of the blur correction optical system, and a rotation interlocking member which rotates the first and second rotating members for fixing in opposite directions. The projections are locked and unlocked as a result of the first and second rotating members for fixing which rotate in a relative manner so that respective notches shift relative to the direction of rotation.

A further blur correction apparatus of the present invention comprises a blur correction optical system acting to correct blurring; and a blur correction drive section for electromagnetically driving the blur correction optical system. The blur correction drive section includes a permanent magnet comprised of at least one of ring magnet and a plurality of arc magnets. The permanent magnet can be polarized into at least two poles within a plane. In this case, it is preferable to arrange coils used in the other drive section for electromagnetic driving an object to be driven in the vicinity of polarization points.

A further blur correction apparatus of the present invention comprises a blur correction optical system acting to correct blurring and a lock member limiting movement of the blur correction optical system. The lock member operates in a plane perpendicular to an optical axis of the blur correction optical system and in the direction of the optical axis. The lock member rotates about the optical axis of the blur correction optical system, and moves in the direction of the optical axis.

When a lock drive section driving the lock member and a lock urging member urging the lock member in the direction of the optical axis are also provided, the blur correction optical system can be locked and unlocked as a result of the lock member being driven by the lock drive section in the direction of the optical axis counter to the urging force of the lock urging member and the lock member being rotated about the optical axis by the lock drive section.

In this case, the lock drive section comprises an arc-shaped permanent magnet magnetically polarized into at least two poles within a plane and a lock coil positioned opposite the permanent magnet at a location in the vicinity of a position of changeover of the magnetic poles. The driving force in the direction of rotation with respect to the permanent magnet can then be generated when current flows in the lock coil and the direction of driving force in a direction of said optical axis is changed when a central position of the lock coil moves across the position of changeover of the magnetic poles.

The lock drive section can comprise projections for fixing provided at a holding frame of the blur correction optical system, first and second rotating members for fixing which rotate about the optical axis having notches larger than the projections for fixing by at least a movable range of the blur correction optical system, and a rotating, interlocking member for rotating the first and second rotating members for fixing in opposite directions. In this case, the lock coil is provided at least one of the first and second rotational members for fixing and the projections are locked and unlocked as a result of the first and second rotating members for fixing which rotate in a relative manner so that respective notches shift relative to the direction of rotation.

A further blur correction apparatus of the present invention comprises a blur correction optical system acting to correct blurring and a blur correction drive section for electromagnetically driving the blur correction optical system. The blur correction drive section includes four coils located evenly about the periphery of the blur correction optical system.

BRIEF DESCRIPTION OF THE DRAWINGS

FIG. 13 is a cross-sectional schematic view taken in the plane G1 in FIG. 12;

FIG. 14 is a cross-sectional schematic view taken in the plane G2 in FIG. 12; and FIG. 15 is a graph showing driving force in a direction Z and driving force in a direction θ with respect to rotational position θ of coil.

DESCRIPTION OF THE PREFERRED EMBODIMENTS

The following is a detailed description with reference to the drawings of the preferred embodiments.

Figure 1:
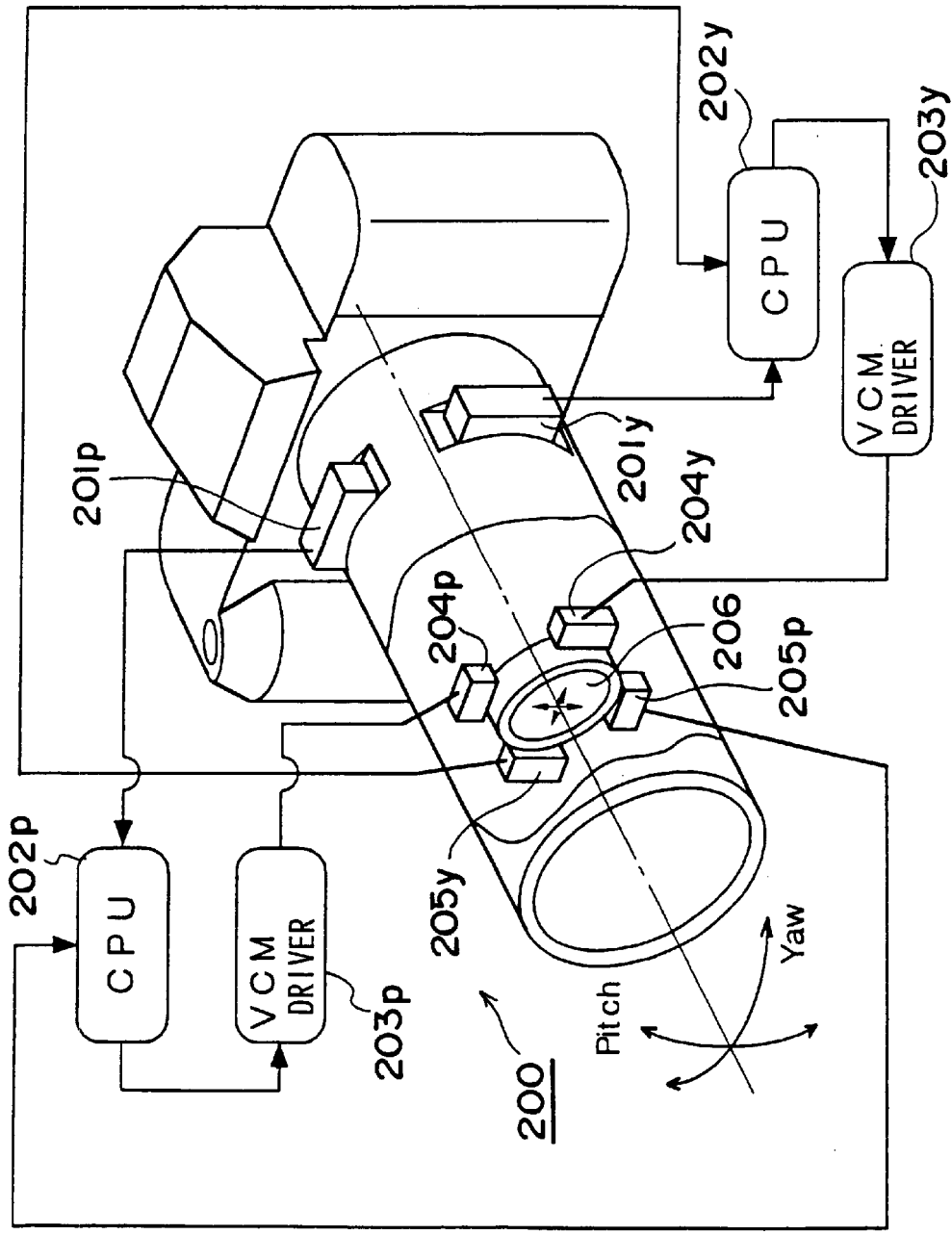
FIG. 1 is a conceptual view of an embodiment of a blur correction apparatus of the present invention mounted on a camera.

FIG. 1 is a conceptual view showing an embodiment where a blur correction apparatus of the present invention is mounted on a camera. Camera shake or camera vibration has six degrees of freedom, three degrees of freedom of rotational motion of pitching, yawing and rolling, and three degrees of freedom of translational motion in directions X, Y and Z. Blur correction is usually carried out for motion of the two degrees of freedom of pitching and yawing.

A blur correction apparatus 200 is equipped with angular velocity sensors 201P and 201y, CPUs 202p and 202y, VCM drivers 203p and 203y, a VCM 204p and VCM 204y, and position sensors 205p and 205y, etc. The appended characters p and y in FIG. 1 are used in the control system for the two systems of pitching and yawing. As the configuration is the same for both the p and the y systems, a description may be given in the following with the p and y reference numerals omitted.

The angular velocity sensor 201 is a sensor for monitoring shaking motion of the camera and employs a piezoelectric oscillation-type angular velocity sensor to detect Coriolis force generated as a result of rotation. The angular velocity sensor 201p is for sensing pitching blur and the angular velocity sensor 201y is for sensing yawing blur.

The CPU 202 is for converting an output of the angular velocity sensor 201 into target position information for a blur correction lens 206. This target position information is then inputted to the VCM 204 or the magnetic driver of the blur correction unit through the VCM driver 203 and the blur correction lens 206 is moved to correct blurring.

A position sensor 205 is for monitoring the position of the blur correction lens 206 and an output of the position sensor 205 is inputted to the CPU 202 and used in controlling driving of the blur correction lens 206.

First Embodiment
(Blur Correction Unit)

Figure 2:
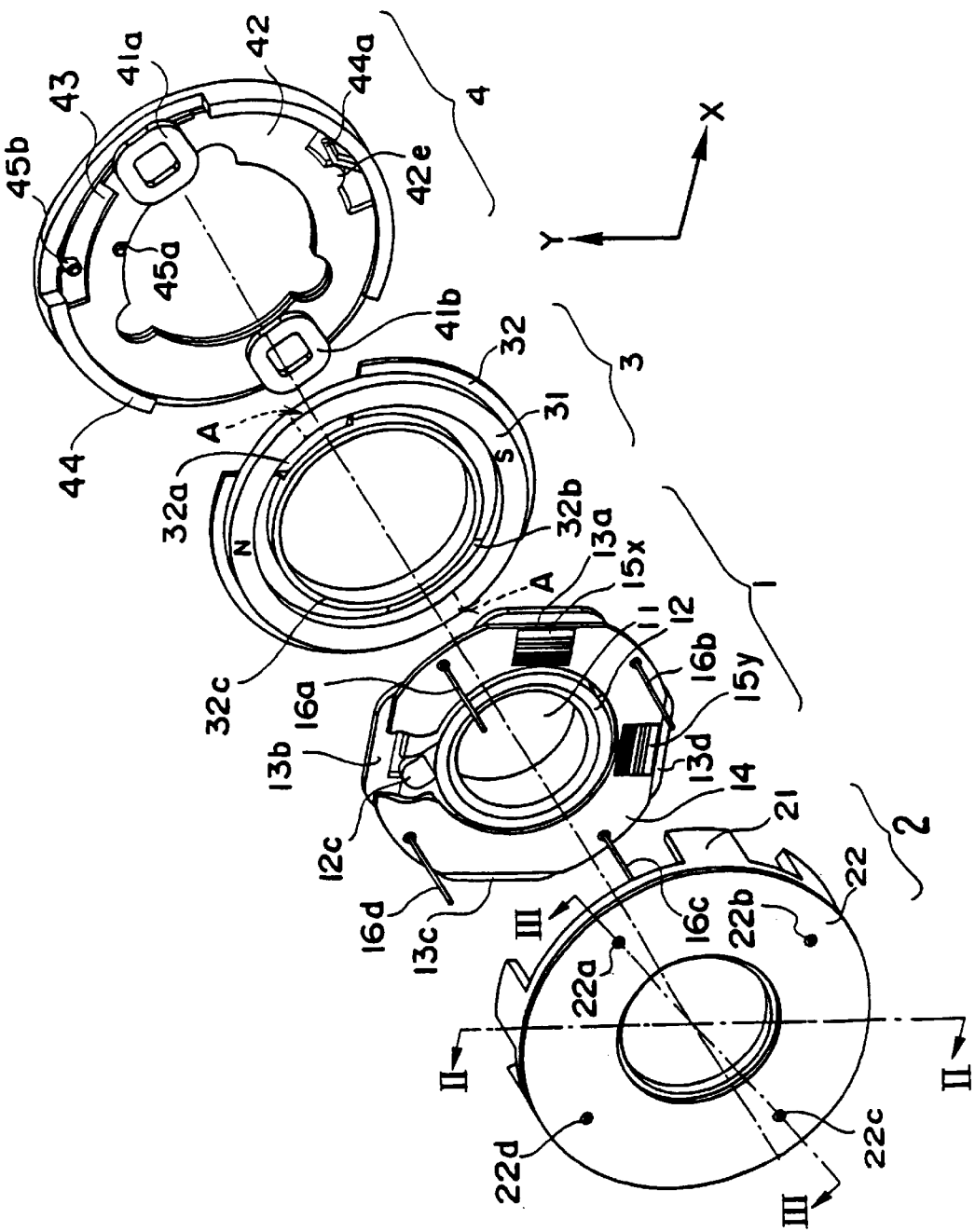
FIG. 2 is an exploded perspective view showing an outline of a blur correction unit of a first embodiment of a blur correction apparatus of the present invention.

FIG. 2 is an exploded perspective view showing an outline of a blur correction unit of a first embodiment of a blur correction apparatus according to the present invention.

This blur correction apparatus comprises a moving unit 1, a reference unit 2, a magnetic circuit unit 3 and a lock unit 4, etc.

The moving unit 1 comprises at least a blur correction lens 11 acting to correct blurring, a lens chamber 12 supporting the blur correction lens 11, drive coils 13a to 13d constituting the magnetic driver section for blur correction, a coil-fixing substrate 14 for fixing the drive coils 13a to 13d, and position-sensing patterns 15x and 15y attached to the coil fixing substrate 14. The moving unit 1 is attached to the reference unit 2 at a decided position by four fine and flexible phosphor bronze rods 16a to 16d.

The four rods 16a to 16d are arranged at positions shifted at 45 degree angles along the circumferential direction with respect to the drive coils 13*a* to 13*d* so as to make efficient use of space and achieve uniformity of driving. A ring magnet 31, which is explained hereinafter, has been magnetically polarized into two poles within a plane and the boundary of two poles exists in a direction of 45 degrees with respect to X and Y axes in the plane perpendicular to the optical axis. Accordingly, two wires 16*a* and 16*c* are then located in the vicinity of the polarization points.

The reference unit 2 comprises a lens barrel attachment part 21 and an annular electric substrate 22 fixed to the lens barrel attachment part 21, etc. A cam pin (not shown) is screwed in at the lens barrel attachment part 21 and the blur correction unit is attached to the lens barrel by this cam pin.

The annular electric substrate 22 is provided with four through-holes 22*a* to 22*d* to which the phosphor bronze rods 16*a* to 16*d* are soldered. A photoreflector 24 (refer to FIG. 3) is attached to the rear side of the annular electric substrate 22 and the position of the blur correction lens 11 is then sensed using position sensing patterns 15*x* and 15*y* provided at the movable unit 1. Although not shown in the drawings, a driver for the blur correction lens 11 or an amplifier for processing the output of the photoreflector 24 can also be mounted at the annular electric substrate 22. The magnetic circuit unit 3 is also fixed to the reference unit 2 by screws etc. (not shown).

The magnetic circuit unit 3 comprises a ring magnet 31 that is a permanent magnet, and a yoke 32 fixed to this ring magnet 31, etc. The ring magnet 31 is magnetically polarized into two poles within a plane and the boundery of polarization exists in a direction of 45 degrees with respect to X and Y axes in the plane perpendicular to the optical axis. The yoke 32 has notches 32*a* and 32*b* in the vicinity of where the magnetic poles of the magnet 31 change over, with coils 41*a* and 41*b* of the lock unit 4 described later fitting into the notches 32*a* and 32*b*. An annular projection 32*c* (refer to FIG. 4) projecting forwards along the optical axis is provided at the inner side periphery of the yoke 32. The drive coils 13*a* to 13*d* are provided opposite to both the projection 32*c* and the ring magnet 31.

The lock unit 4 comprises lock drive coils 41*a* and 41*b*, a lock rotating disc 42 to which the lock drive coils 41*a* and 41*b* are fixed by adhering and supported in such a manner as to be freely rotatable about the optical axis, a lock rotating disc 43, also supported in such a manner as to be freely rotatable about the optical axis, and a lock base plate 44 supporting the lock rotating discs 42 and 43, etc. The lock base plate 44 is fixed to the yoke 32 of the magnetic circuit unit 3 and supports the lock unit 4 (refer to FIG. 3).

(Driver for Blur Correction Lens)

Figure 3:
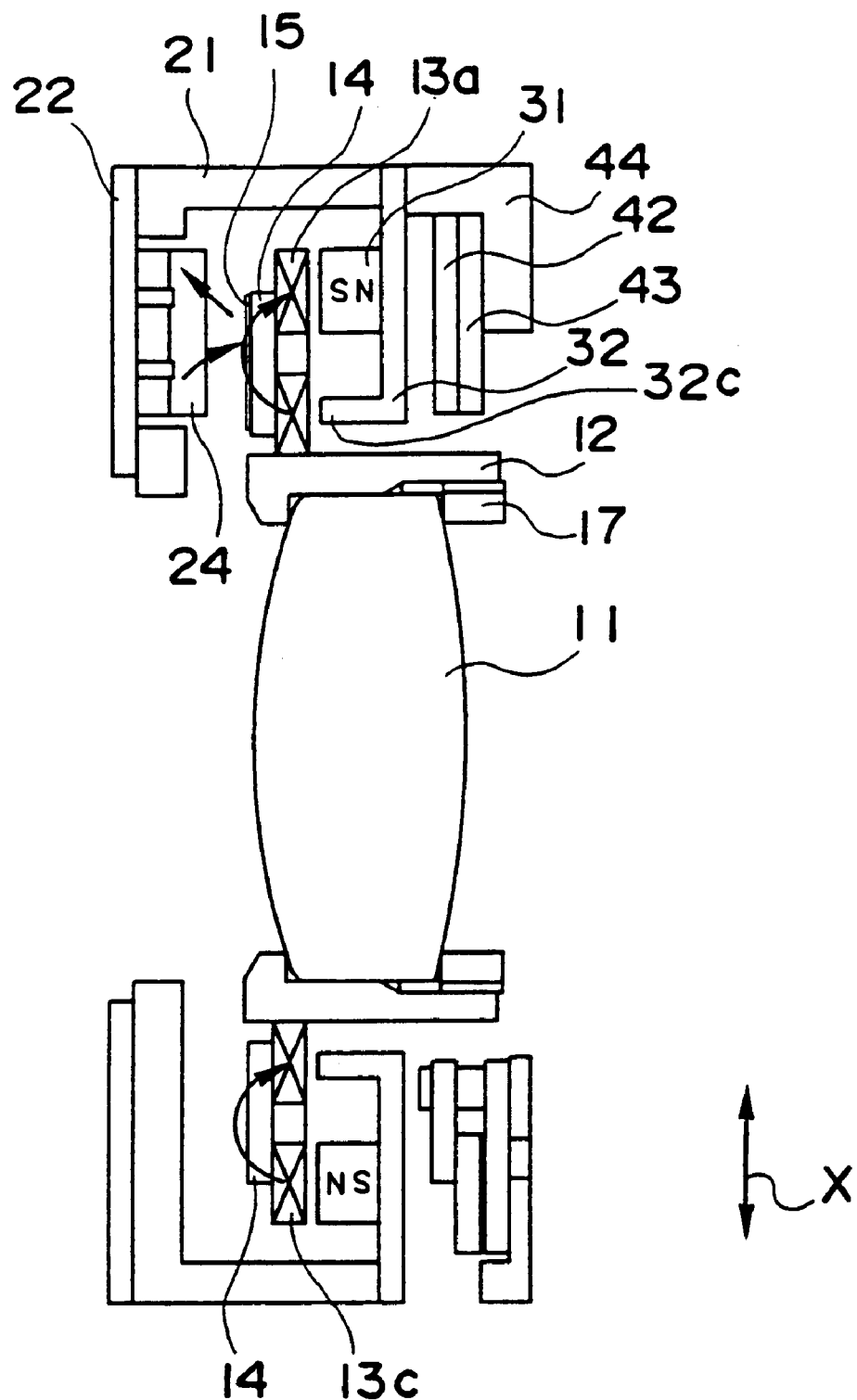
FIG. 3 is a cross-sectional view (along line II—II of FIG. 2) showing a blur correction lens driver section of the blur correction apparatus of this embodiment.
Figure 4:
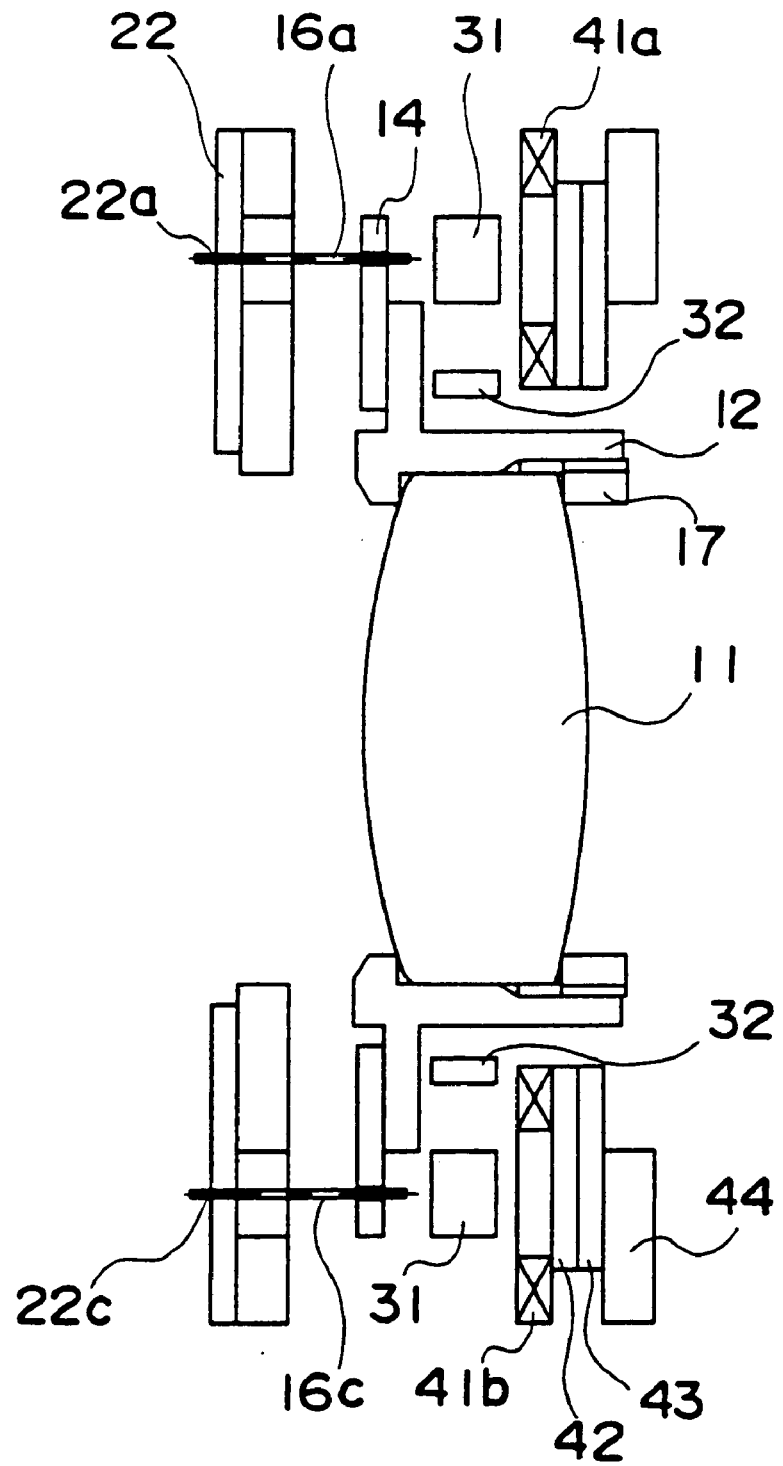
FIG. 4 is a cross-sectional view (along line III—III of FIG. 2) showing a blur correction lens driver section of the blur correction apparatus of this embodiment.

FIG. 3 and FIG. 4 are cross-sectional views showing the blur correction lens driver section of the blur correction apparatus of this embodiment, where FIG. 3 is a cross-sectional view along line II—II of FIG. 2 and FIG. 4 is a cross-sectional view along line III—III of FIG. 2, and where only parts of the mechanism for driving in the X direction of the blur correction unit are shown.

In FIG. 3, the blur correction lens 11 fits into the lens chamber 12 and is fixed by a securing ring 17. At the lens chamber 12, the coil fixing substrate 14 is fixed by thermal fastening means (not shown) and drive coils 13*a* and 13*c* are soldered onto the coil fixing plate 14.

The ring magnet 31 is positioned in such a manner that there is a fixed gap between the ring magnet 31 and the drive coils 13*a* and 13*c*. The ring magnet 31 is drawn by magnetic force towards the yoke 32 so as to become fixed to the yoke 32 in such a manner as to form the magnetic circuit. A magnetic circuit shown by the arrows in FIG. 3 is formed because lines of magnetic force go from the north pole of the ring magnet 31 towards the projection 32*c* of the yoke 32. Force is therefore generated in a vertical direction (X direction) in the drawing when current flows in the drive coils 13*a* and 13*c*.

The drive coils 13*a* and 13*c* are wound in such a manner as to generate force in the same direction and are connected together in series. As shown in FIG. 4, power is supplied to the drive coils 13*a* and 13*c* via the flexible phosphor bronze rods 16*a* to 16*d*. Specifically, current is supplied to the drive coils 13*a* and 13*c* from the annular electric substrate 22 via the through-holes 22*a* to 22*d* of the annular electric substrate 22, the phosphor bronze rods 16*a* to 16*d*, and the coil fixing substrate 14 (also refer to FIG. 3). The drive coils 13*a* and 13*c* are connected in series as coils for driving in the X direction and the drive coils 13*b* and 13*d* are similarly connected in series as coils for driving in the Y direction.

Driving force of the drive coils for the blur correction lens 11 is therefore divided into two by using two drive coils for the X direction and two drive coils in the Y direction and the drive coils can therefore be made small and the outer diameter of the whole of the blur correction unit can be made small as a result of making the drive coils small.

(Method of Sensing the Position of the Blur Correction Lens)

As shown in FIG. 3, the position of the blur correction lens 11 is monitored using the photoreflector 24 soldered to the rear surface of the annular electric substrate 22. The photoreflector 24 comprises an IR-LED and a phototransistor, with infrared light generated from the IR-LED being reflected by a reflecting plate 15 so as to become incident to the phototransistor. As shown in FIG. 2, the reflecting plate 15 has a pattern by which reflected light changes along the sensing direction (driving direction). The output of the phototransistor therefore changes depending on the position of the reflecting plate 15 and the position of the blur correction lens 11 can be detected by monitoring the output of the phototransistor.

(Blur Correction Lens Lock Unit)

The blur correction apparatus of this embodiment requires a lock unit when a detachable lens for single lens reflex is employed. The reason for this is that when there is no lock unit, the blur correction lens 11 moves for no reason when the blur correction apparatus is not intended to operate and the image on the finder will therefore become difficult to see. Further, when there is no lock unit, it is difficult to maintain the blur correction lens 11 with the optical axis at its center and image deterioration may then occur.

Figure 5A:
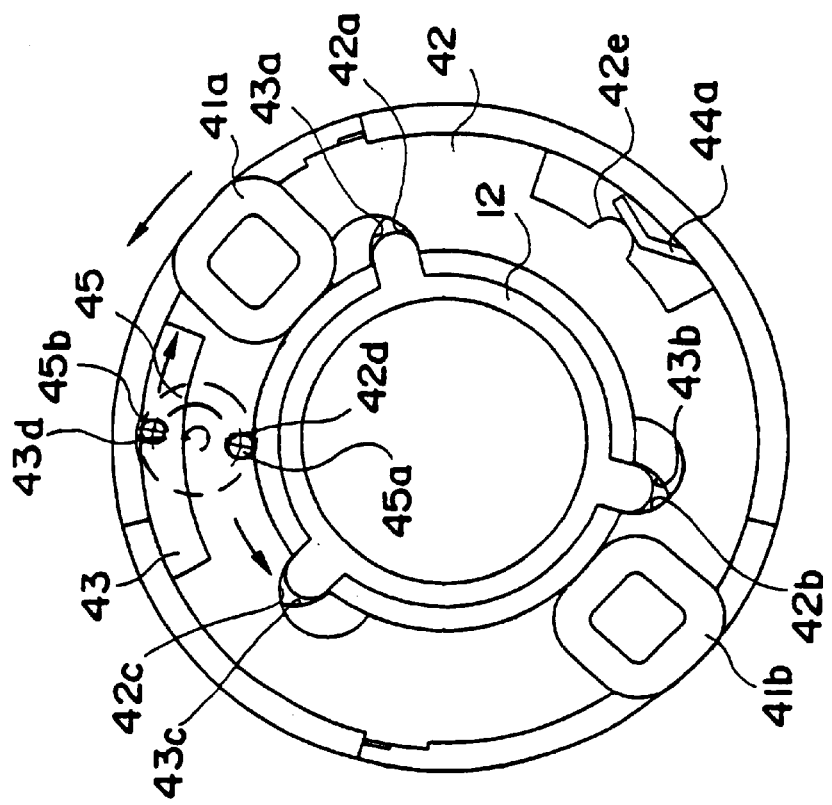
FIG. 5A and FIG. 5B are views showing the details of a lock unit for a blur correction apparatus of this embodiment, with FIG. 5A showing an unlocked state and FIG. 5B showing a locked state.
Figure 5B:
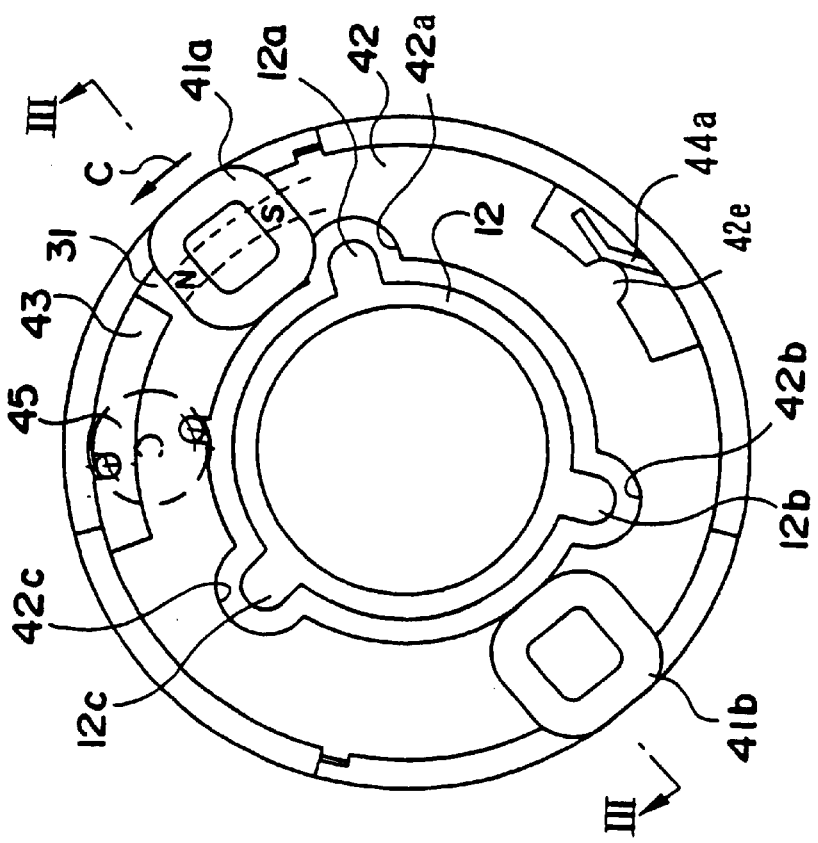
Figure 6:
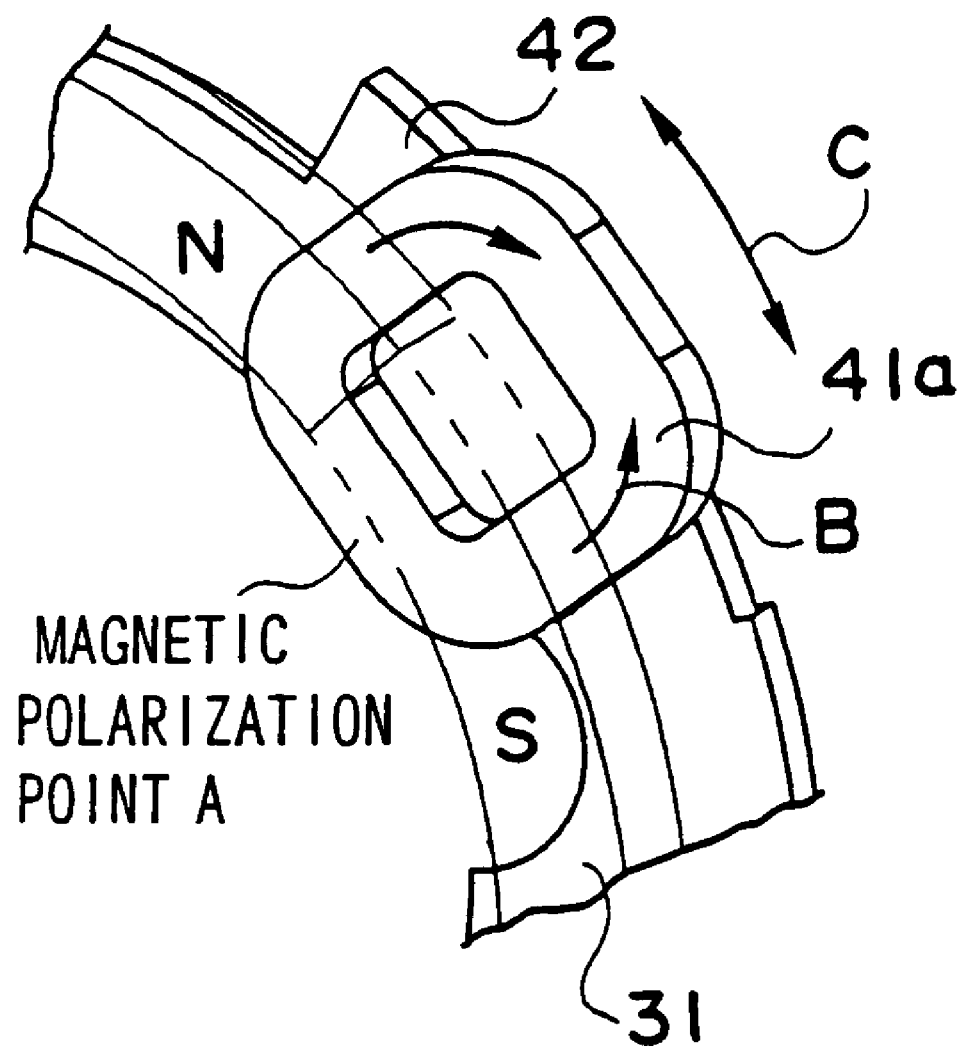
FIG. 6 is a view showing lock drive coils of the lock units of FIG. 5A and FIG. 5B.

FIG. 5A and FIG. 5B are views showing the details of a lock unit for a blur correction apparatus of this embodiment, with FIG. 5A showing an unlocked state and FIG. 5B showing a locked state. FIG. 6 is a view showing the lock drive coils of the lock units of FIG. 5A and FIG. 5B. The lock unit 4 comprises the lock drive coils 41*a* and 41*b*, the lock rotating discs 42 and 43, the lock base plate 44 and a rotating plate 45, etc.

As described above, the lock drive coils 41*a* and 41*b* fit into the notches 32*a* and 32*b* of the yoke 32 in the vicinity of the changing over of the magnetic poles of the ring magnet 31 (A of FIG. 6). Force is then generated in a direction of rotation about the optical axis (C of FIG. 6) when a current flows through the lock drive coils 41*a* and 41*b* (B of FIG. 6).

The lock drive coils 41*a* and 41*b* are wound and connected together in series in such a manner that force is generated in the same direction when a current flows. Two lock drive coils are provided in this embodiment but just one may also be provided if sufficient driving force is provided.

When the lock drive coils 41a and 41b generate force in a direction counterclockwise direction about the optical axis, the lock rotating disc 42 to which the lock drive coils 41a and 41b are attached rotates in a counterclockwise direction. A notch 42d is provided in the lock rotating disc 42, into which a pin 45a of the rotating plate 45 (rotating interlocking member) is inserted. The rotating plate 45 then rotates in a clockwise direction as a result of the lock rotating disc 42 rotating in a counterclockwise direction. Another pin 45b of the rotating plate 45 then fits into the notch 43d of the lock rotating disc 43 and the lock rotating disc 43 rotates in a clockwise direction.

Three projections 12a, 12b and 12c are provided in the lens chamber 12, with three notches 42a, 42b and 42c, and 43a, 43b and 43c each being provided at the lock rotating discs 42 and 43 so as to correspond to the projections 12a, 12b and 12c. When unlocked, sufficient space for movement between the notches 42a, 42b and 42c, etc. is maintained around the edges of projections 12a, 12b and 12c, as shown in FIG. 5A.

Each of the notches 42a, 42b, 42c, 43a, 43b and 43c of the lock rotating discs 42 and 43 sandwich the projections 12a, 12b and 12c of the lens chamber 12 in accompaniment with rotation of the lock rotating discs 42 and 43 and the lens chamber 12 is secured. This embodiment employs a structure where three projections are used to secure the lens chamber but it is also possible to just use two. The lens chamber projections are sandwiched from both sides by the notches of the lock rotating discs 42 and 43 and there is therefore no twisting even when the lens chamber 12 is supported by the phosphor bronze rods 16a to 16d.

The lock base plate 44 is provided with a projecting sideways-v-shaped spring 44 for maintaining the locked state, that secures the projection 42e of the lock rotating disc 42. A locked state can therefore be maintained by this spring 44a even if the supply of electricity to the lock drive coils 41a and 41b is stopped.

According to the embodiment described above, a magnet for driving a blur correction lens can also be employed in lock driving. The thickness of the blur correction unit along the direction of the optical axis can therefore be reduced and the number of the parts of the configuration can be reduced. The number of magnets for driving the blur correction lens can also be reduced to one and the number of parts can therefore be reduced.

Figure 7:
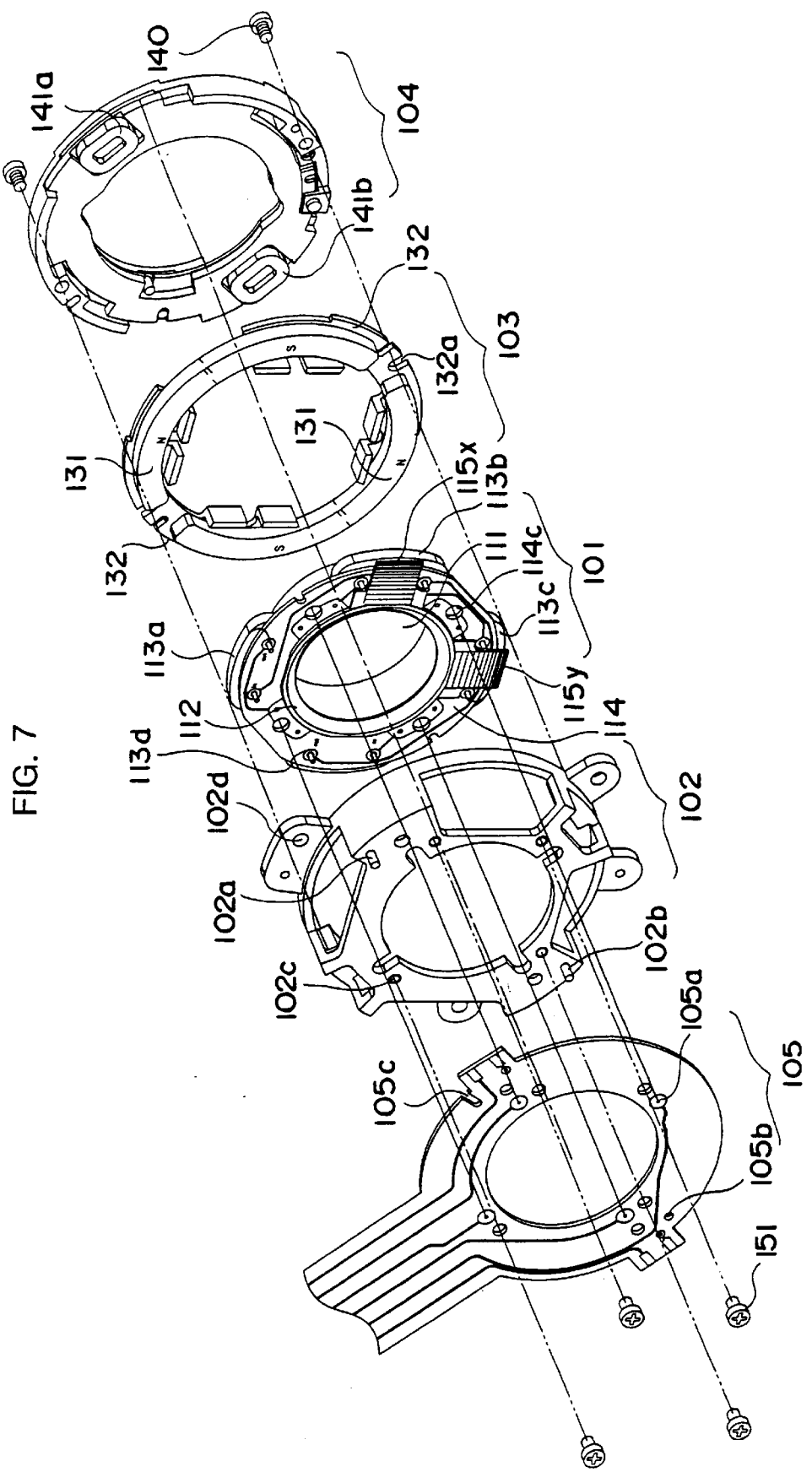
FIG. 7 is an exploded perspective view showing an outline of the blur correction unit of a second embodiment of a blur correction apparatus of the present invention.

FIG. 7 is an exploded perspective view showing an outline of the blur correction unit of a second embodiment of a blur correction apparatus according to the present invention. The blur correction apparatus of the second embodiment comprises a moving unit 101, a base frame 102, a magnetic circuit unit 103, a lock unit 104 and an annular main plate 105, etc.

(Moving Unit)

The moving unit 101 comprises a support section capable of supporting the blur correction lens 111 and a drive section capable of causing movement in two dimensions in a plane perpendicular to the optical axis.

Figure 8:
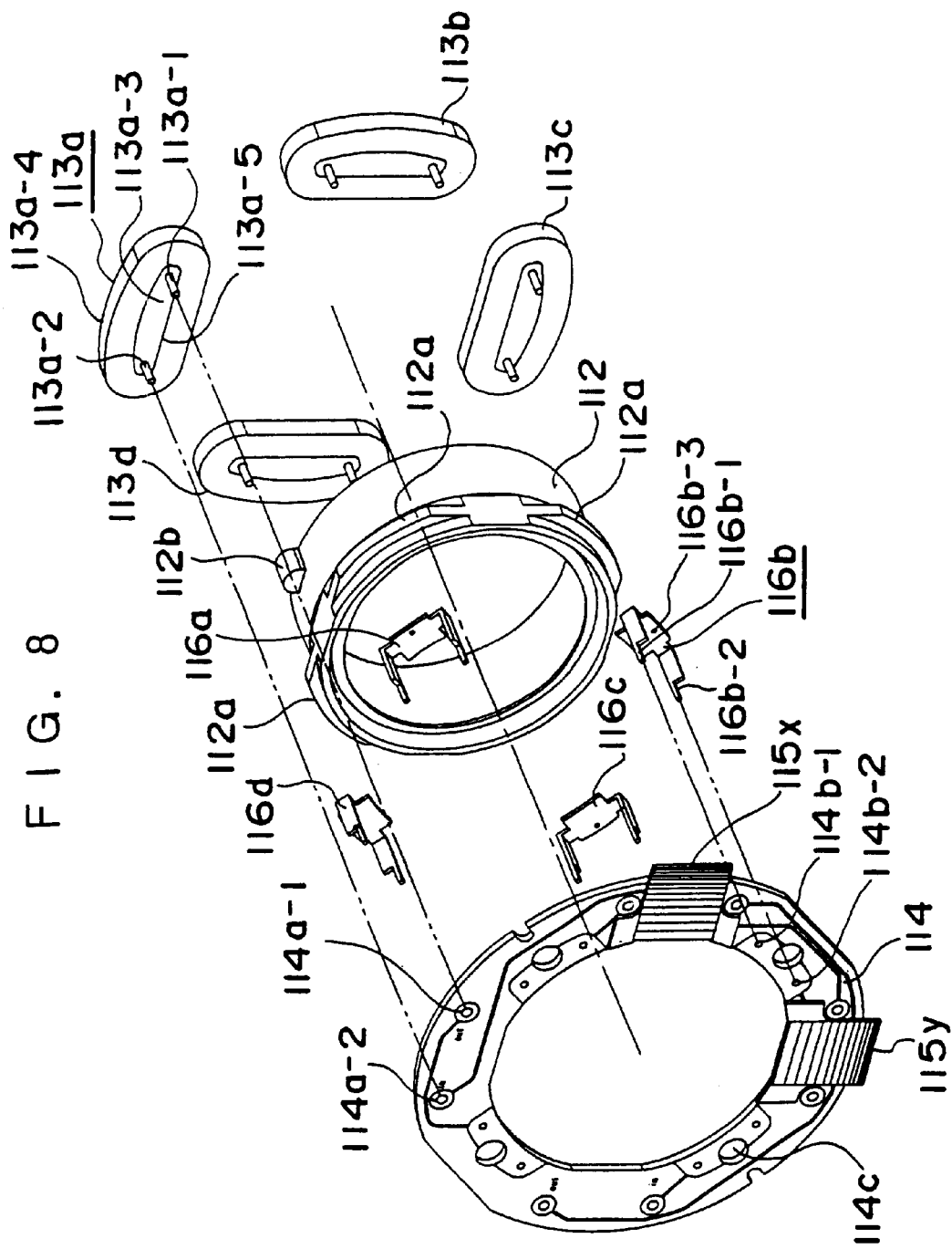
FIG. 8 is an exploded perspective view showing the details of a moving unit of the second embodiment.

FIG. 8 is an exploded perspective view showing the details of a moving unit of the second embodiment. A drive coil 113 (113a to 113d) is a coil for electromagnetically driving the blur correction lens 111. The drive coil 113 consists of copper wire lined up and wound onto a copper wire core 113a-3 made of highly heat-resistant plastic. Coil terminals 113a-4 and 113a-5 are wires leading out of the ends of the winding. Metal terminals 113a-1 and 113a-2 are inserted at the core 113a-3.

A moving substrate 114 is an annular electrical substrate provided with holes 114a-1 and 114a-2 having an electrical pattern. Regarding the drive coils 113a to 113d, terminal 113a-1 is inserted into hole 114a-1 of the moving substrate 114, terminal 113a-2 is inserted into hole 114a-2, coil terminal 113a-4 is soldered to terminal 113a-1 and coil terminal 113a-5 is soldered to terminal 113a-2. Conduction between the drive coil 113 and the moving substrate 114 can therefore be ensured.

Holes for attaching the coil are provided at a total of eight locations on the moving substrate 114 in such a manner that the drive coils are attached to the moving substrate 114 at equal intervals. Ribbon wire is preferable to round wire as the wire material for the drive coils. In this case, the positioning of the moving substrate 114 and the coil can be carried out using a jig and the coils can be fixed onto the pattern of the moving substrate 114 by direct soldering.

The copper plate 116 (116a to 116d) is for attaching 4WS wires described later and is bent from conductive metal such as, for example, a sheet of phosphor bronze etc. The copper sheets 116a to 116d are the same shape. Describing copper plate 116b as an example, a hole 116b-3 approximately 0.3 mm in diameter through which 4WS wire can be passed for soldering is made in the bottom center of the copper plate 116b. Terminals 116b-1 and 116b-2 are then provided at the copper plate 116 so as to enable fixing by soldering at the holes 114b-1 and 114b-2 of the moving substrate 114.

Holes for fixing the copper plates are provided at a total of eight locations at the moving substrate 114 so that the copper plates 116a to 116d can be attached at four locations spaced at equal angles taking the optical axis as center. An electrical pattern is also provided at the copper plate fixing holes so as to provide conduction with the pattern for the coil attaching holes.

The lens chamber 112 is a member for supporting a blur correction lens 111. Flanges 112a are provided at this lens chamber 112 at four locations (one location is not shown). The moving substrate 114 fits into the upper parts of these flanges 112a and is fixed by adhesion at the flanges 112a.

Semicircular projections 112b for use in a lock described later are provided at two locations (one location is not shown) positioned symmetrically with respect to the optical axis at the lens chamber 112. Plates 115x and 115y provided with patterns used in position sensing described later are attached to the moving substrate 114.

Returning to FIG. 7, a description of the moving unit 101 will now be given. The moving unit 101 described before is supported by four wires (4WS wire) made of beryllium-copper etc. of a diameter of approximately 0.1 mm and are flexible. This wire is soldered to a hole 116-3 of a copper plate 116, passed through a hole 114c of a moving substrate 114 and soldered to a through-hole 105a of the annular main substrate 105. The blur correction lens 111 can then be moved in two dimensions within a plane perpendicular to the optical axis using these wires. It is therefore possible with this blur correction lens 111 for a current to flow from the annular main substrate 105, through the 4WS wire into the coils.

When the blur correction lens 111 is supported using 4WS wire it is important to ensure that the center of gravity of the moving section coincides with the center of the blur correction lens 111 and the center of driving force. If the position of the center of gravity is off, the moving unit 101 will become twisted when the blur correction lens 111 is driven and it will be difficult to reliably control the position of the blur correction lens 111.

In this embodiment, the center of gravity of the moving unit 101 can be positioned at the center of the blur correction lens 111 and at the center of the driving force by arrangement of the drive coils 113a to 113d at four locations equally spaced about the periphery of the blur correction lens 111.
(Base frame and Annular Main Substrate)

A photoreflector (not shown) is attached to the back surface of an annular main substrate 105 and receives reflected infrared light projected at patterns 115a and 115y provided at the moving substrate 114. The patterns 115x and 115y are provided in such a manner as to vary from light to dark. These patterns 115x and 115y also move when the moving unit 101 moves so that the reflectance as viewed from the photoreflector changes. The photoreflector then senses differences in reflectance and the position of the blur correction lens 111 can be detected.

A notch 105c and a hole 105b are provided at the annular main substrate 105 and inserted with pins 102a and 102b of the base frame 102 to be positioned. The annular main substrate 105 is then fixed to the base frame 102 using screws 151. Screw holes 102d for attachment to the lens barrel (not shown) are provided at three locations on the base frame 102. The blur correction unit is then attached to the lens barrel using these screw holes 102d.

The moving unit 101 is accomodated at the back surface of the base frame 102 and the magnetic circuit unit 103 is attached in such a manner as not to hinder movement of the moving unit 101.
(Magnetic Unit)

The magnetic unit 103 comprises two arc magnets 131 and two yokes 132 onto which the arc magnets 131 are fixed. The arc magnets 131 are magnets magnetically polarized into two poles within a plane in such a manner that the magnetic poles change over at a central position thereof. By using arc magnets instead of a ring magnet, the weight of the magnets is reduced and gaps between the magnets can be used for other functions. Further, with a ring magnet it is difficult to reliably discern the position of changing over of the magnetic poles but by using arc shapes, the position of change over of the magnetic poles can be identified effortlessly during assembly.

The same configuration as for the magnetic circuit described above can also be adopted with four arc magnets formed by dividing the arc magnets into two in the vicinity of the change over of the magnetic poles. In this case, the number of magnets increases but magnetic polarization within the plane is no longer necessary. The drop in magnetic flux in the vicinity of the magnetic pole changeover point can therefore be reduced and lock drive efficiency (described later) can be increased.

The yokes 132 are then divided in the vicinity of the magnetic pole changeover point of the magnets and coils 141a and 141b (described later) of the lock unit 104 are accomodated at portions where there is no yoke.
(Lock Unit)

The lock unit 104 is a unit for locking in such a manner as to restrict the movement of the blur correction lens 111 when blur correction is not carried out. The lock unit 104 is fixed to the base frame 102 via a yoke notch 132a using a screw 140. The magnetic circuit unit 103 and the lock unit 104 at the back of the base frame 102 are then fixed at the predetermined position using a positioning pin (not shown).
(Blur Correction Drive Theory)

The following is a description of the theory of driving a blur correction lens.

Figure 9:
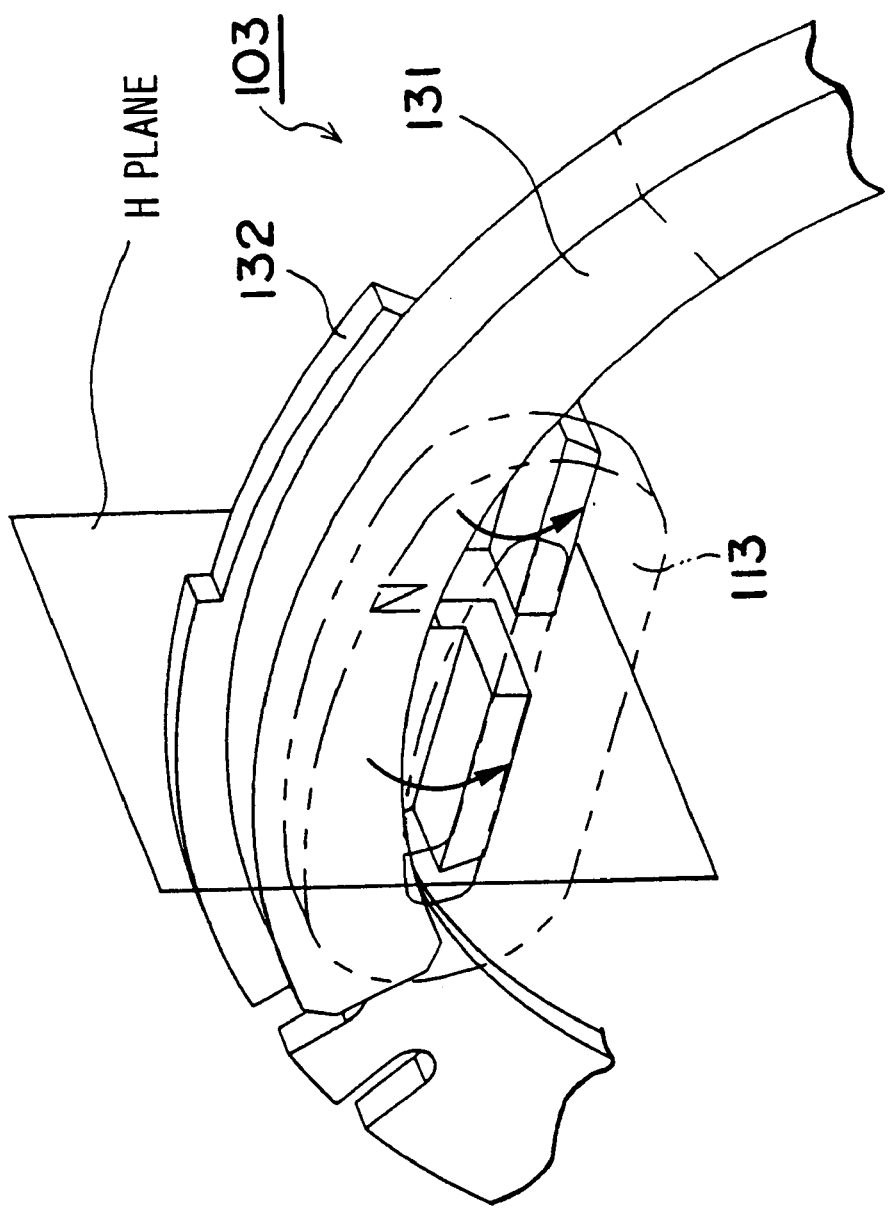
FIG. 9 is a view partially showing a drive coil and a magnetic circuit unit of the second embodiment.
Figure 10:
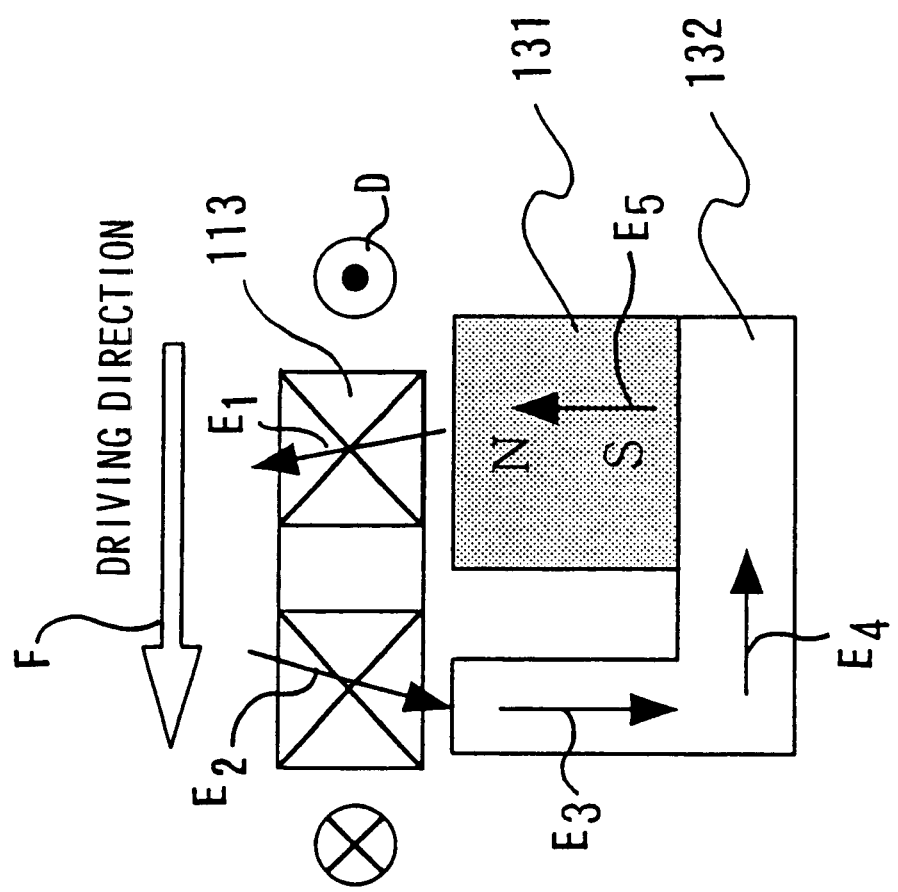
FIG. 10 is a cross-sectional view cut along plane H of FIG. 9.

FIG. 9 is a view partially showing a drive coil 113 and magnetic circuit 103 unit of the second embodiment. FIG. 10 is a cross-sectional view along plane H of FIG. 9. Current flows in a coil 113 in a direction (D) from front to back with regards to the surface of the paper. Magnetic flux then flows to the projections of the yoke 132 from the north pole of the magnet 131 (E1, E2), passes through the lower surface of the yoke 132, and returns to the south pole of the magnet 131 (E3, E4, E5). At this time, magnetic flux crosses the coil 113 in the direction of the arrows (E1 and E2) in FIG. 10. When a current then flows in the coil, according to Flemings right-hand law, a drive force is generated in a direction (F) from the left to the right of the surface of the paper.
(Details of Lock Unit)

Figure 11:
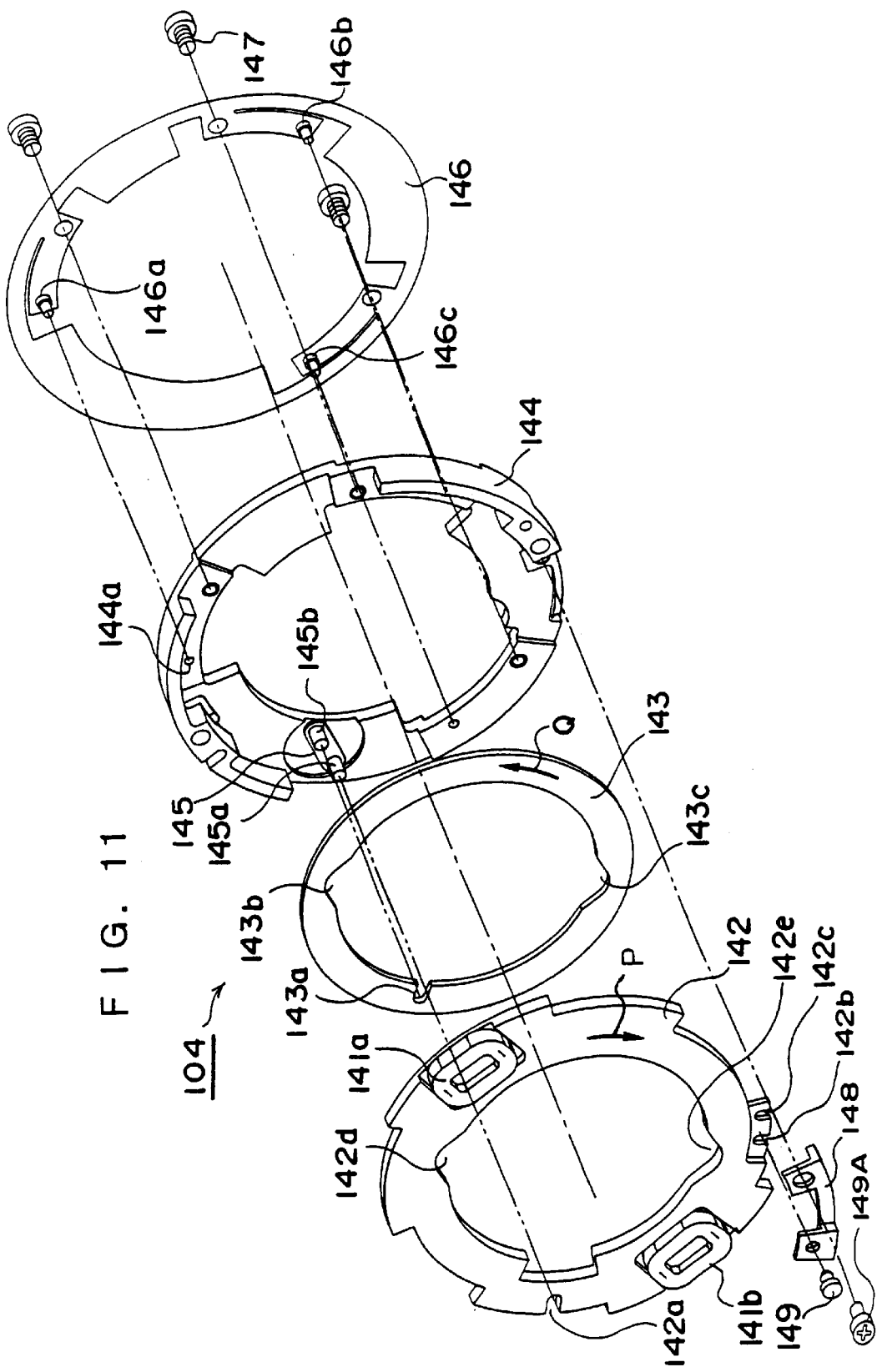
FIG. 11 is an exploded view showing a lock unit of the second embodiment.

The following is a detailed description with reference to FIG. 11 of the lock unit. FIG. 11 is an exploded perspective view showing the lock unit of this embodiment. A lock base frame 144 is a member for supporting the lock unit 104 and is provided at an inner side with a fitting part. The outer periphery of a lock disc 143 then fits into the fitting part of the lock base frame 144 so as to be supported in a manner where action in the direction of rotation and the direction of the optical axis with respect to the lock base frame 144 is possible.

The outer periphery of the lock disk 142 also fits into the lock base frame 144 and is supported so as to be operable in the direction of rotation and in the direction of the optical axis. The lock drive coils 141a and 141b are adhered to the lock disc 142.

An inverting plate 145 is for rotating the lock disc 143 in the opposite direction with respect to movement of the lock disc 142. The inverting plate 145 has two pins on its front surface and one pin (not shown) on its rear surface, with the rear surface pin fitting into a fitting hole (not shown) provided at the lock base frame 144. One pin 145a of the inverting plate 145 fits into a notch 142a of the lock disc 142 and the other pin 145b fits into a notch 143a of the lock disc 143. In this way, when the lock disc 142 is rotated in a clockwise direction during the locking operation, the lock disc 143 is rotated in a counterclockwise direction.

An annular plate spring 146 is fixed to the rear surface of the lock base frame 144 using a screw 147. Pins 146a to 146c are provided at the annular plate spring 146, and respectively fit with holes 144a of the lock base frame 144 so that a head part thereof urges the lock disk 142 in the direction of the optical axis.

A latch pin support member 148 is fixed to the lock base frame 144 by a screw 149A. A latch pin 149 is then press-fitted to the latch pin support member 148 and can then be fitted with notches 142b and 142c provided at two locations on the lock disk 142.
(Lock Drive Theory)

Figure 12:
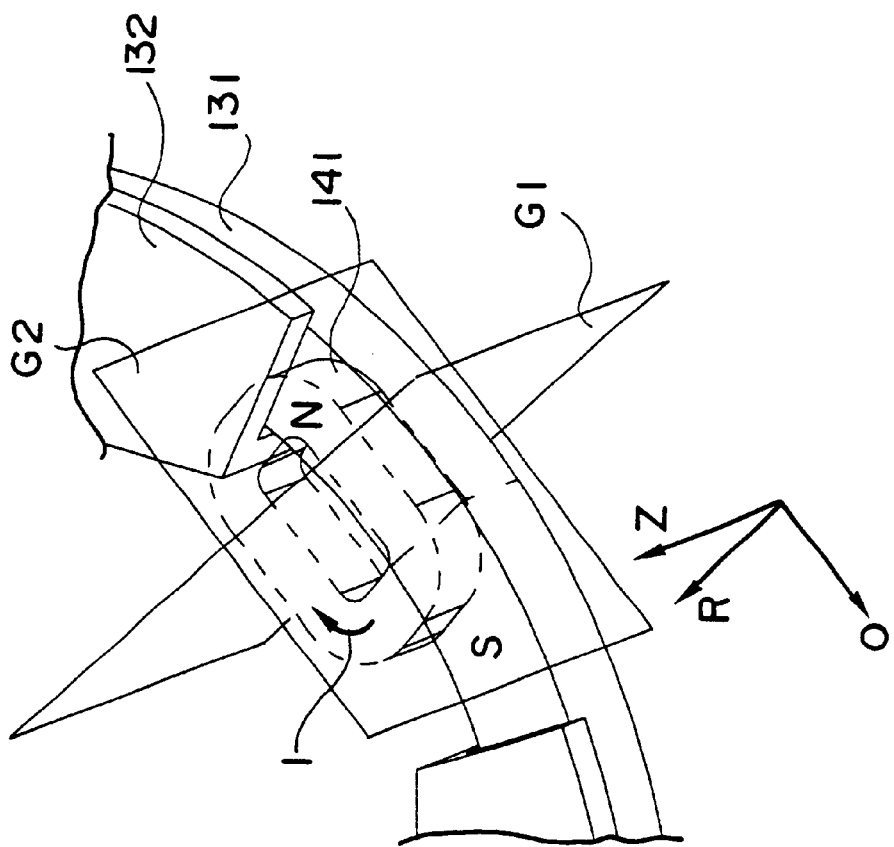
FIG. 12 is a perspective view showing elements necessary for lock driving.

The following is a description of lock driving theory of the present invention. FIG. 12 is a perspective view showing elements necessary for lock driving. FIG. 13 is a cross-sectional schematic view of the plane G1 in FIG. 12. FIG. 14 is a cross-sectional schematic view of the plane G2 in FIG. 12.

As shown in FIG. 12, prior to opening the lock, the position of changeover of the magnetic poles of the magnet and the position of the center of the lock drive coils are out of line with each other.

As shown in FIG. 13, as the magnetic flux flows from the north pole N to the south pole S (J1, J2, J3, J4), when a current flows in the coil in a direction shown by (I) in the drawings, a drive force (K) in a direction Z in the drawings is generated. The direction (K1, K2) of this drive force changes depending on the rotation position angle ($\theta$) of the coil.

As shown in FIG. 14, looking at a cross-section taken in a longitudinal direction of the coil, a drive force is generated in a $\theta$ direction and a Z direction, and the direction of the drive force is different depending on the side of the coil.

FIG. 15 is a graph showing driving force in a direction Z and driving force in a direction θ with respect to rotational position θ of the coil. As shown in FIG. 15, rotational direction drive force (L) does not change depending on the coil rotational position θ but optical axis direction drive force (M) changes substantially. It can therefore be discerned that the coil rotation position as to optical axis direction drive force (M) reverses at the lock position and the unlock position.

Next, a description is given in order, with reference to FIG. 11.

In the unlocked state, a latch pin 149 fits into the notch 142b of the lock disc 142 and an unlocked state is maintained due to the lock urging pins 146a to 146c urging the lock disc 142 in the left direction in FIG. 11 because of the annular plate spring 146.

Next, when current flows in the lock coil, a clockwise force is generated at the lock drive coils 141a and 141b and a force in the direction of the optical axis is generated to press the urging pins 146a to 146c downwardly. At this time, the latch pin 149 is not permitted to come away from the notch 142b and the lock disc 142 cannot be rotated in a clockwise direction.

When the latch pin 149 comes out of the notch 142b, the lock disc 142 rotates in a clockwise direction (P). At this time, the lock disc 143 starts to rotate in a counterclockwise direction (Q) due to the inverting plate 145. When the rotational position of the lock coil changes due to the rotation of the lock disc 142, the force in the direction of the optical axis reverses and force in the left direction in the drawings is generated (refer to K1 and K2 of FIG. 14).

When the latch pin 149 fits into the notch 142c, rotation of the lock disc 142 and the lock disc 143 stops and the lock operation is complete. The locked state is then maintained because the lock disc 142 is urged in the left direction in the drawings by the lock urging pins 146a to 146c and the annular plate spring 146.

Further, depressions 142d and 142e are present at the lock disc 142 and depressions 143b and 143c are present at the lock disc 143. In the locked state, projections (not shown) provided at the lens chamber 112 are sandwiched by the depressions 142d and 143b and the depressions 142e and 143c and movement of the lens chamber 112 is therefore restricted and locked. When unlocking, current flows in the lock coil in the opposite direction to when locking to carry out opposite movement to when locking so that a transition to an unlocked state is possible.

According to this embodiment, locking and unlocking is performed by carrying out movement in the direction of the optical axis and movement in a rotational direction separately. It is therefore possible to provide a lock mechanism where the possibility of a transition to a locked state when in an unlocked state or the possibility of a transition to an unlocked state when in a locked state is small even when the blur correction unit is disturbed, where retention precision is superior during locking, and which is highly reliable.

[Modifications]

The present invention is by no means limited to the embodiments described above and various modifications and changes are possible without deviating from the essential essence of the present invention.

(1) The rotational drive mechanism for locking described previously can be used to drive a shutter or electromagnetic iris on the blur correction unit side.

It is also possible to employ two of the four rotational driving magnets in blur correction lens locking and use the remaining two magnets for a shutter or an electromagnetic iris.

(2) In the aforementioned embodiment, the ring magnet 31 is magnetically polarized into two poles within a plane and lock drive coils are located at the two polarization points. However, when the rotational driving force is insufficient, a ring magnet magnetically polarized into four poles within a plane can be employed and four rotational drive coils can be employed located at the four points of changeover of magnetic polarity. As the direction of drive force generated by the drive coil for the blur correction lens is reversed in this case, the coil connection for the two drive coils for the X direction and the two drive coils for the Y direction is reversed.

(3) The example of a ring magnet given is a single ring magnet but this may be divided into two or more magnets.

(4) In the second embodiment, an example is given where the latch pin 149 fits into the notches 142b and 142c. However a frictional member pressed by movement in the direction of the optical axis may also be provided, so that locking is performed by frictional force.

(5) In the second embodiment, locking and unlocking is performed by the movement operations, one operation in the direction of the optical-axis and the other operation in a direction of rotation about the optical axis. However, such rotation does not have to center about the optical axis, and can also be linear movement within a plane perpendicular to the optical axis.

What is claimed is:

1. A blur correction apparatus comprising:
a blur correction optical system acting to correct blurring; and
a blur correction drive section which electromagnetically drives said blur correction optical system,
wherein said blur correction drive section includes a permanent magnet, one surface of said permanent magnet being used in said blur correction drive section and the other surface being used in another drive section for electromagnetically driving an object to be driven.

2. The blur correction apparatus according to claim 1,
wherein said blur correction drive section comprises:
a yoke fixed to said permanent magnet and having projections formed at intervals along said permanent magnet; and
four coils provided opposite to both said permanent magnet and said projections with a gap and connected to said blur correction optical system.

3. The blur correction apparatus according to claim 2, wherein:
said permanent magnet is polarized into at least two poles within a plane;
coils used in said other drive section for electromagnetically driving said object are arranged located in the vicinity of polarization points;
said blur correction optical system is supported by four flexible wire-shaped members; and
at least two of said flexible wire-shaped members are located in the vicinity of said polarization points.

4. The blur correction apparatus according to claim 1,
further comprising a photographing optical system,
wherein said other drive section rotates about an optical axis of said photographing optical system.

5. The blur correction apparatus according to claim 4,
wherein said other drive section is a lock drive section which limits movement of said blur correction optical system; and
said lock drive section comprises:

projections for fixing provided on a holding frame of said blur correction optical system;

first and second rotating members for fixing which rotate about said optical axis and have notches larger than said projections for fixing by at least a movable range of said blur correction optical system; and a rotation interlocking member which rotates said first and second rotating members for fixing in opposite directions, wherein said projections are locked and unlocked due to rotation of said first and second rotating members for fixing in opposite directions so that respective notches shift relative to a direction of rotation.

6. A blur correction apparatus comprising:

a blur correction optical system acting to correct blurring;

a lock member which limits movement of said blur correction optical system, the lock member being movable in a direction of an optical axis of the blur correction optical system and being rotatable around the optical axis; and a lock member driving unit which drives said lock member by imparting to said lock member an axial driving force in the direction of the optical axis of said blur correction optical system and a rotatable driving force around the optical axis so that the lock member moves in the direction of the optical axis and rotates around the optical axis in order to move between a locked position and an unlocked position.

7. The blur correction apparatus according to claim 6, further comprising:

a lock drive section which drives said lock member; and a lock urging member which urges said lock member in a direction of said optical axis, wherein said blur correction optical system is locked and unlocked as a result of said lock member being driven by said lock drive section in the direction of said optical axis counter to an urging force of said lock urging member and said lock member being rotated about said optical axis by said lock drive section.

8. The blur correction apparatus according to claim 7, wherein said lock drive section comprises:

an arc-shaped permanent magnet magnetically polarized into at least two poles within a plane; and a lock coil provided opposite to said permanent magnet at a location in the vicinity of a position of changeover of said magnetic poles, wherein driving force in a direction of rotation with respect to said permanent magnet is generated when current flows in said lock coil and said direction of driving force in a direction of said optical axis is changed when a central position of said lock coil moves across said position of changeover of said magnetic poles.

9. The blur correction apparatus according to claim 8, said lock drive section comprising:

projections for fixing provided at a holding frame of said blur correction optical system;

first and second rotating members for fixing which rotate about said optical axis and have notches larger than said projections for fixing by at least a movable range of said blur correction optical system; and a rotation interlocking member which rotates said first and second rotating members for fixing in opposite directions, wherein said lock coil is provided at at least one of said first and second rotating members for fixing; and said projections are locked and unlocked as a result of said first and second rotating members for fixing rotating in a relative manner so that respective notches shift relative to a direction of rotation.

10. A blur correction apparatus comprising:

a blur correction optical system acting to correct blurring; and a blur correction drive section which electromagnetically drives said blur correction optical system, wherein said blur correction drive section includes four coils, and said four coils are located evenly about the periphery of said blur correction optical system.

* * * * *